United States Patent
Skög et al.

(10) Patent No.: US 10,382,945 B2
(45) Date of Patent: Aug. 13, 2019

(54) DELIVERY OF DATA SERVICES TO A ROAMING NETWORK USER

(71) Applicant: Telefonaktiebolaget LM Ericsson (publ), Stockholm (SE)

(72) Inventors: Robert Skög, Hässelby (SE); Michael Huber, Täby (SE); Johan Kölhi, Vaxholm (SE); Andreas Ljunggren, Vällingby (SE); John Orre, Saltsjöbaden (SE); Bjorn Stromberg, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 15/127,543

(22) PCT Filed: Mar. 21, 2014

(86) PCT No.: PCT/EP2014/055711
§ 371 (c)(1),
(2) Date: Sep. 20, 2016

(87) PCT Pub. No.: WO2015/139771
PCT Pub. Date: Sep. 24, 2015

(65) Prior Publication Data
US 2017/0142571 A1 May 18, 2017

(51) Int. Cl.
*H04W 4/00* (2018.01)
*H04W 8/12* (2009.01)
(Continued)

(52) U.S. Cl.
CPC .............. *H04W 8/12* (2013.01); *H04W 4/60* (2018.02); *H04W 8/18* (2013.01); *H04W 28/06* (2013.01);
(Continued)

(58) Field of Classification Search
CPC ......... H04W 8/183; H04W 8/18; H04W 8/12; H04W 8/04; H04W 8/06; H04W 48/16;
(Continued)

(56) References Cited

U.S. PATENT DOCUMENTS

2007/0298788 A1 12/2007 Corson et al.
2010/0199316 A1* 8/2010 Clarniello .............. H04H 60/91
725/62
(Continued)

FOREIGN PATENT DOCUMENTS

EP 1 241 902 A2 9/2002
GB 2 401 747 A 11/2004

OTHER PUBLICATIONS

International Search Report and Written Opinion issued in International application No. PCT/EP2014/055711, dated Nov. 17, 2014, 9 pages.

*Primary Examiner* — Temica M Beamer
(74) *Attorney, Agent, or Firm* — Rothwell, Figg, Ernst & Manbeck P.C.

(57) ABSTRACT

A method (100) in a network node is disclosed, the method for delivering data services to a roaming user accessing the services via a user equipment device. The method comprises identifying services to be made available to the user when roaming (110) presenting the identified services to the user equipment device (120), and filtering at least one of data traffic to the user equipment device or data traffic from the user equipment device according to a relation of the data traffic to the identified services (130). Also disclosed is a method (600) in a user equipment device, the method for accessing data services when roaming. The method comprises accessing, from a network node, an identification of services available to a user of the user equipment device when roaming (610), selecting, from the identification of services, services for presentation to the user (620), present-
(Continued)

ing the selected services to the user (630), and on request of a presented service by the user, initiating a connection to a provider of the requested service (650). Also disclosed are a computer program product for carrying out the above methods and a network node (400, 500) and user equipment device (700, 800) configured to carry out the above methods.

33 Claims, 9 Drawing Sheets

(51) Int. Cl.
| | |
|---|---|
| *H04W 4/60* | (2018.01) |
| *H04W 8/18* | (2009.01) |
| *H04W 28/06* | (2009.01) |
| *H04W 76/30* | (2018.01) |
| *H04W 76/10* | (2018.01) |
| *H04W 48/04* | (2009.01) |
| *H04W 48/16* | (2009.01) |
| *H04W 48/18* | (2009.01) |
| *H04W 8/02* | (2009.01) |
| *H04W 28/18* | (2009.01) |
| *H04W 48/02* | (2009.01) |

(52) U.S. Cl.
CPC ........... *H04W 48/04* (2013.01); *H04W 48/16* (2013.01); *H04W 48/18* (2013.01); *H04W 76/10* (2018.02); *H04W 76/30* (2018.02); *H04W 8/02* (2013.01); *H04W 28/18* (2013.01); *H04W 48/02* (2013.01)

(58) Field of Classification Search
CPC ....... H04W 48/18; H04W 8/26; H04W 92/24; H04W 60/00; H04W 60/04; H04W 60/02; H04W 12/06
USPC ........... 455/432.1, 432.3, 433, 435.1, 456.1, 455/456.2
See application file for complete search history.

(56) References Cited

U.S. PATENT DOCUMENTS

2011/0251868 A1* 10/2011 Mikurak ................ G06Q 10/06
 705/7.25
2015/0230127 A1* 8/2015 Raleigh ............... H04L 41/0893
 370/230

* cited by examiner

DELIVERY OF DATA SERVICES TO A ROAMING NETWORK USER

CROSS REFERENCE TO RELATED APPLICATION(S)

This application is a 35 U.S.C. § 371 National Phase Entry Application from PCT/EP2014/055711, filed Mar. 21, 2014, designating the United States, the disclosure of which is incorporated by reference.

TECHNICAL FIELD

The present invention relates to a method, and a network node, for delivering data services to a roaming user accessing the services via a user equipment device. The present invention also relates to a method, and a user equipment device, for accessing data services when roaming. The invention also relates to a computer program product configured, when run on a computer, to carry out a method for delivering data services or for accessing data services.

BACKGROUND

Telecommunications networks are increasingly used to deliver data services to network users. These services may be offered by an operator of the network or may be offered, via the network, by independent service providers. When a user is within the geographic coverage area of their home network, that is the network to which they subscribe, data services are requested and delivered via a gateway support node within the home network, through which data traffic may be exchanged with an external network such as the internet. The majority of network operators offer varying levels of data access for users within their different subscription offerings.

When a network user is outside the geographic coverage area of their home network, they may still access voice and data services by connecting to their home network via a visited network with which their home network has a roaming agreement. When roaming, data traffic from the user is routed through the visited network to the home network, and incoming data traffic is routed via the home network to the visited network before reaching the user. While this arrangement offers the advantage of maintaining access to data services for a roaming user, roaming data access typically results in high charges for roaming data services, as the cost of data traffic through both the home and visited networks is covered by the user. Consequently, many users disable the data service capability within their wireless device in order to avoid these high charges.

The practice of disabling mobile data when roaming is disadvantageous both for the user and for network operators. Home and visited networks are deprived of revenue generating data traffic, and the user is obliged to go without data services which they are accustomed to accessing. Many data services may be of even greater practical value to a user when travelling outside their home network coverage area, for example when travelling internationally, and it is thus a significant disadvantage for users to be constrained to go without these services when roaming because of the high cost associated with their use.

SUMMARY

It is an aim of the present invention to provide a method and apparatus which obviate or reduce at least one or more of the disadvantages mentioned above.

According to a first aspect of the present invention, there is provided a method, in a network node, for delivering data services to a roaming user accessing the services via a user equipment device. The method comprises identifying services to be made available to the user when roaming, presenting the identified services to the user equipment device and filtering at least one of data traffic to the user equipment device or data traffic from the user equipment device according to a relation of the data traffic to the identified services.

Aspects of the present invention thus introduce a network based filter, allowing access only to certain selected data services when a user is roaming, and filtering out data traffic relating to services not included within the selection. This introduces a degree of flexibility and control into data roaming, providing customers with an alternative to a simple on/off choice for data functionality when roaming. For the purposes of the present specification, "roaming" is considered to refer to a user located outside the coverage area of their home network.

In some examples, identifying services to be made available to the user when roaming may comprise retrieving an identification of at least one service from a memory. The memory may for example correspond to a database of services or service providers to be offered to the user when roaming. Such service providers may have entered into an agreement with a network operator of the network node, to provide their services to users when roaming.

In some examples, identifying services to be made available to the user when roaming may further comprise filtering the retrieved service or services according to a geographic location of the user equipment device. Various levels of geographic filtering may be applied, including for example country, region, city, district, street, etc. In this manner, the method may enable the presentation to the user of services which are particularly relevant to the user in their present location.

In some examples, identifying services to be made available to the user when roaming may further comprise filtering the retrieved service or services according to a network user profile of the user. The network user profile may for example be stored in the network node or may be stored in another network element accessible to the network node. The profile may be configurable both by the user and/or by an operator of the network of which the node is a part.

In some examples, presenting the identified services to the user equipment device may comprise publishing the services to a platform accessible to the user equipment device. The platform may for example be hosted by the network node and may be an Application programming Interface (API). The platform may be accessible by the user equipment device for example via an application running on the user equipment device.

In some examples, filtering at least one of data traffic to the user equipment device or data traffic from the user equipment device according to a relation of the data traffic to the identified services may comprise forwarding data traffic corresponding to the identified services to its destination address and withholding data traffic not corresponding to the identified services. Correspondence with identified services may for example be determined according to one of an origin or a destination address of the traffic, for example traffic may be considered as corresponding to an identified service if one of the origin or destination address of the traffic is an address of the provider of an identified service. By withholding traffic not corresponding to the identified services, the method may avoid incurring data charges associated with services that are not among the identified services to be made available.

In some examples, withholding data traffic may comprise at least one of stopping the data traffic, or temporarily storing the data traffic and sending an information message to the user equipment device. The information message may for example inform the user that data traffic corresponding to services other than the identified services is being held, and inviting the user to approve delivery of the traffic. The information message may for example be sent when the traffic originates from the user equipment device.

In some examples, the network node may be comprised within a home network of the user. In other examples, the method the network node may be comprised within a visited network of the user.

In some examples, identifying services to be made available to the user when roaming may further comprise interrogating a home network of the user for a network user profile of the user.

In some examples, filtering at least one of data traffic to the user equipment device or data traffic from the user equipment device according to a relation of the data traffic to the identified services may comprises filtering the traffic according to an Access Point Name of the traffic. In such examples, a particular Access Point Name may be applied to route traffic corresponding to the identified services directly through the visited network without passing through the home network.

In some examples, the method may further comprise terminating an established data communication channel to the user equipment device after a period of inactivity on the channel exceeding a threshold limit.

According to another aspect of the present invention, there is provided a method, in a user equipment device, for accessing data services when roaming. The method comprises accessing, from a network node, an identification of services available to a user of the user equipment device when roaming, selecting, from the identification of services, services for presentation to the user and presenting the selected services to the user. The method further comprises, on request of a presented service by the user, initiating a connection to a provider of the requested service.

In some examples, accessing an identification of services available to a user of the user equipment device when roaming may comprise accessing a platform in the network node to which the services are published.

In some examples, selecting services for presentation to the user may comprise filtering the services according to a device user profile of the user. The device user profile of the user may for example be configurable by the user.

In some examples, the method may further comprise, after selecting services for presentation to the user, comparing applications associated with the selected services with applications installed on the user equipment device. The selected services may for example be accessed via applications which may be installed on the user equipment device or may be remotely hosted. The comparison step may thus establish which of the selected services has an associated application installed on the user equipment device.

In some examples, presenting the selected services to the user may comprise, for a selected service having an associated application installed on the user equipment device, presenting a link to the associated application on the user equipment device, and for a selected service not having an associated application installed on the user equipment device, presenting a link to a remotely hosted application for the selected service. The link may in some examples be a URL (Uniform Resource Locator) pointing to an application corresponding to the selected service which is hosted on an external network such as the internet.

In some examples, for a requested service having an associated application installed on the user equipment device, initiating a connection to a provider of the requested service may further comprise launching the application within the user equipment device.

In some examples, for a requested service not having an associated application installed on the user equipment device, initiating a connection to a provider of the requested service may further comprise following the link to launch the remotely hosted application.

In some examples, initiating a connection to a provider of the requested service may comprise using an Access Point Name corresponding to a home network of the user equipment.

In further examples, initiating a connection to a provider of the requested service may comprise using an Access Point Name corresponding to a visited network of the user equipment.

According to another aspect of the present invention, there is provided a computer program product configured, when run on a computer, to conduct a method according to any of the above aspects of the present invention.

According to another aspect of the present invention, there is provided a network node configured for delivering data services to a roaming user accessing the services via a user equipment device. The node comprises an identifying unit configured to identify services to be made available to the user when roaming, a presenting unit configured to present the identified services to the user equipment device, and a traffic filtering unit configured to filter at least one of data traffic to the user equipment device or data traffic from the user equipment device according to a relation of the data traffic to the identified services.

In some examples, the network node may be a Multipurpose Proxy node or may be a Gateway GPRS Support Node.

In some examples, the identifying unit may further comprise a retrieving unit configured to retrieve an identification of at least one service from a memory.

In some examples, the identifying unit may further comprise a service filtering unit configured to filter the retrieved service or services according to at least one of a geographic location of the user equipment device or a network user profile of the user.

In some examples, the network node may further comprise a host unit configured to host a platform accessible to the user equipment device.

In some examples, the network node may further comprise a timer unit configured to terminate an established data communication channel to the user equipment device after a period of inactivity on the channel exceeding a threshold limit.

According to another aspect of the present invention, there is provided a user equipment device configured for accessing data services when roaming. The user equipment device comprises an access unit configured to access, from a network node, an identification of services available to a user of the user equipment device when roaming, a selecting unit configured to select, from the identification of services, services for presentation to the user and a display unit configured to present the selected services to the user. The user equipment device further comprises a connection unit configured, on request of a presented service by the user, to initiate a connection to a provider of the requested service.

In some examples, the user equipment device may further comprise a comparison unit, which may be configured to compare applications associated with the services selected by the selecting unit with applications installed on the user equipment device.

According to another aspect of the present invention, there is provided a network node configured for delivering data services to a roaming user accessing the services via a user equipment device. The network node comprises a processor and a memory, the memory containing instructions executable by the processor whereby the network node is operative to identify services to be made available to the user when roaming, present the identified services to the user equipment device, and filter at least one of data traffic to the user equipment device or data traffic from the user equipment device according to a relation of the data traffic to the identified services.

According to another aspect of the present invention, there is provided a user equipment device configured for accessing data services when roaming. The user equipment device comprises a processor and a memory, the memory containing instructions executable by the processor whereby the network node is operative to access, from a network node, an identification of services available to a user of the user equipment device when roaming, select, from the identification of services, services for presentation to the user, present the selected services to the user, and, on request of a presented service by the user, initiate a connection to a provider of the requested service.

BRIEF DESCRIPTION OF THE DRAWINGS

For a better understanding of the present invention, and to show more clearly how it may be carried into effect, reference will now be made, by way of example, to the following drawings in which:

FIG. 6b is a flow chart illustrating additional process steps which may be conducted as part of the method of FIG. 6a.

DETAILED DESCRIPTION

Aspects of the present invention provide a method for delivering data services to a roaming user, and a method for accessing services when roaming, enabling a user to access certain presented data services made available through a communications network. These services are presented to the user via a network node, and data traffic to and/or from the user is then filtered according to whether or not it corresponds to one of the presented services.

Figure 1:
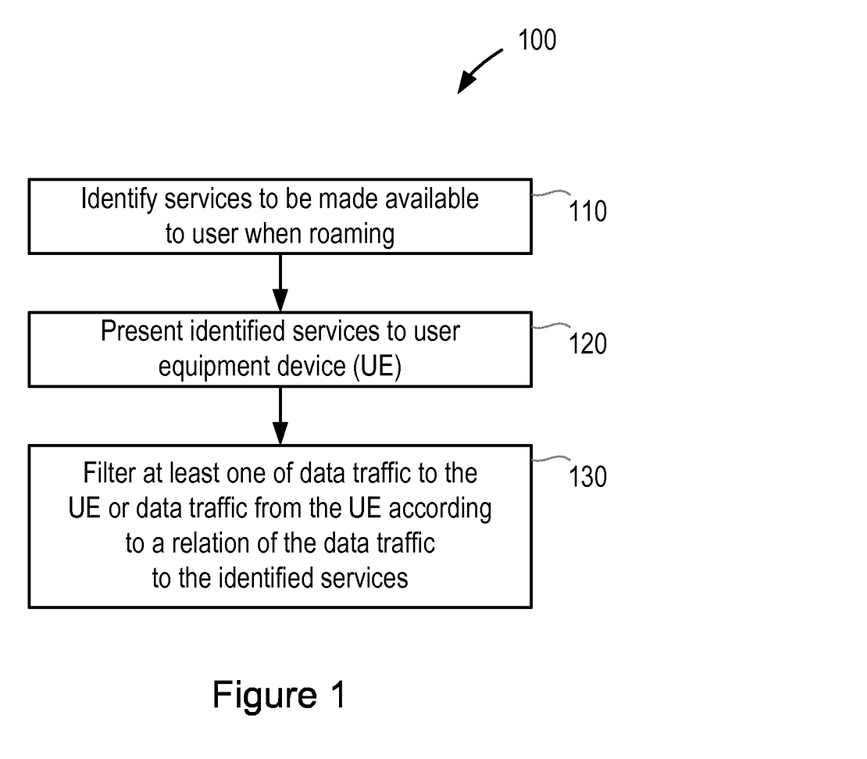
FIG. 1 is a flow chart illustrating process steps in a method for delivering data services to a roaming user.

FIG. 1 illustrates process steps in a method 100 for delivering data services to a roaming user who is accessing those service via a User Equipment device (UE). The method may take place in a network node which may for example be a Multiservice Proxy node (MSP) or a Gateway GPRS Support Node (GGSN). For the purposes of illustration, the method is described below as taking place in a nominal "network node". The node may be located in a home network of the user or a visited network of the user, as discussed in further detail below.

In a first step 110, the method 100 comprises identifying services to be made available to a user when roaming. The method then comprises presenting the identified services to the UE of the user in step 120. Finally, in step 130, the method comprises filtering at least one of data traffic to the user's UE or data traffic from the user's UE according to a relation of the traffic to the identified services. Each of these steps is described in further detail below with reference to FIG. 2.

The method may enable a network operator to propose particular data services to a roaming user, and subsequently allow only traffic relating to those services to be forwarded to its destination. These services may be particularly advantageous or appropriate to the roaming user, and in one example maybe made available to the user at a beneficial rate. In an example implantation of the invention, service providers may choose to cover at least part of the cost for a user of using their service while roaming.

In this manner, specific services may be made available to a user free of charge when roaming, or at least at a reduced rate, matching the cost of using the service when within the coverage area of their home network. These services may be the identified services which are to be made available to the user while roaming according to the method of FIG. 1.

Figure 2:
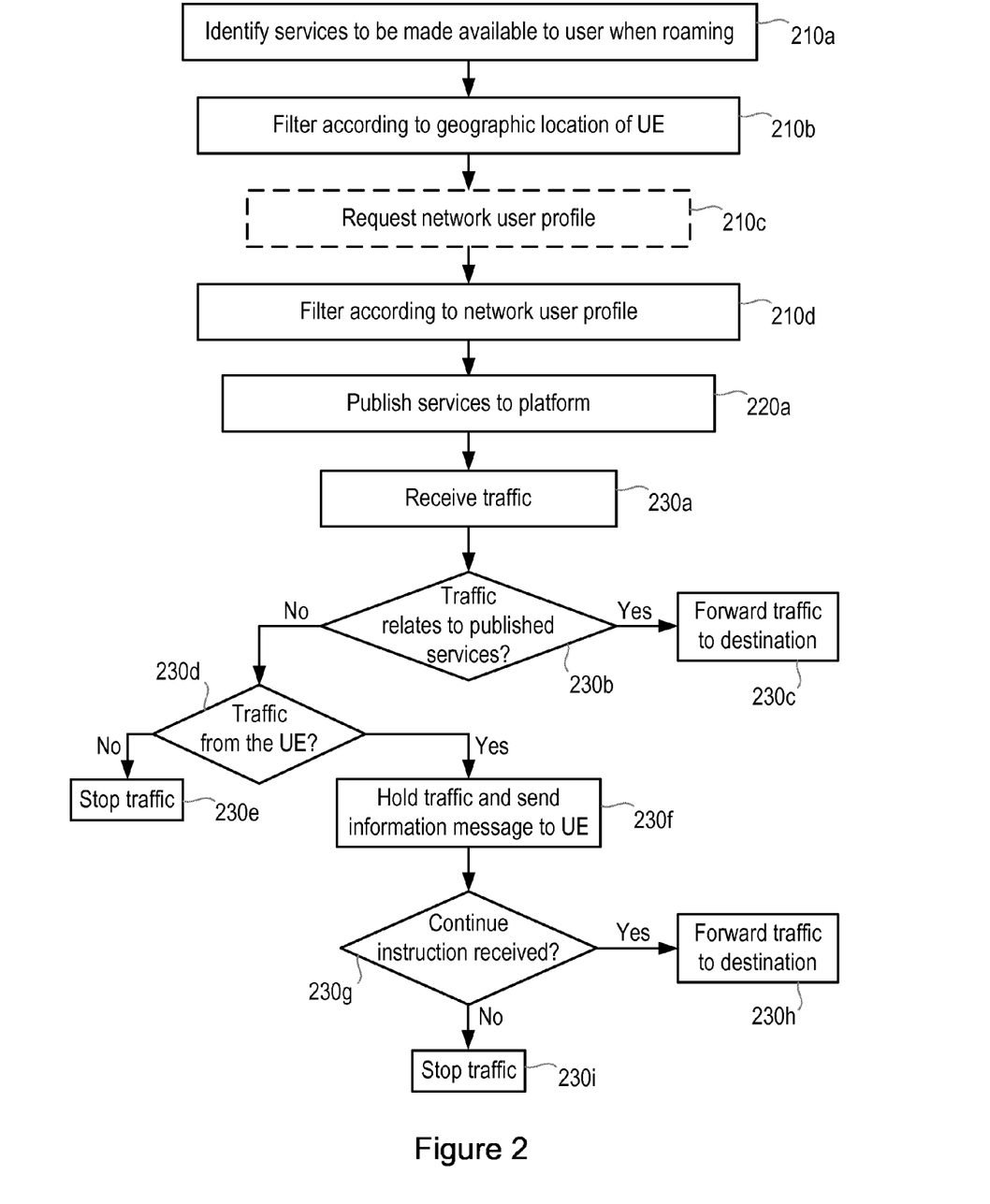
FIG. 2 is a flow chart illustrating process steps in another method for delivering data services to a roaming user.

FIG. 2 illustrates another method 200 in which the steps of method 100 are further subdivided or refined to illustrate one way in which the functionality of the method 100 may be achieved. Referring to FIG. 2, the step 110 of identifying services to be made available to a user when roaming may be divided into several sub steps conducted by the network node. In a first sub step 210a, the node retrieves an identification of at least one service from a memory. Referring to the example implementation discussed above, the memory may comprise a database of service providers who have entered into an agreement with the operator of the network of which the node is a part to offer their serves free of charge, or at a reduced rate, to roaming users. The node may thus retrieve, at stub step 210a, any and all services from the database which are to be offered free or at preferential rates to users.

In a second sub step 210b, the node filters the retrieved services according to a geographic location of the roaming user equipment device. This filtering step may enable the identification of those services most appropriate to the user in their present location. The filtering may be conducted at different levels of detail, for example certain services may be filtered according to the user's current country, state, region, city, district or event street.

In a subsequent sub step 210c, the network node may request a network user profile. This sub step may be appropriate if the network node is part of a visited network for the user as opposed to the user's home network. In this situation, the network node may request the user's network profile from the user's home network. In other examples, when the network node is a part of the user's home network, the network user profile may be stored in a different network element, so the network node may interrogate the other network element to obtain the user's network user profile. The node may then filter the retrieved services at sub step 210*d* according to the user's network user profile. This profile may include user preferences such as for example spoken languages, preferred credit cards or mobile payment preferences, food, hotel, entertainment or public transport preferences, or other areas of interest including for example museums, concerts or exhibitions etc. The user network profile may be configurable both by the user and by the network operator, allowing the network operator to take advantage of network management information concerning the user to propose appropriate services from among those that are to be made available to the user when roaming.

The effect of the above discussed filtering sub steps is to identify a subset of all services which may be made available to the user when roaming, the subset including only those services which are most likely to be of interest to the user in their current situation. Certain services, including for example social media services, may be geographically independent, and their inclusion or exclusion during the filtering process may be purely based on the user's network user profile. Other services such as hotels, taxi services or restaurant services may be highly location specific, and filtering according to geographic location may permit the inclusion only of services appropriate to the user's current location.

Referring again to FIG. 2, having filtered the retrieved services, the method comprises presenting the filtered services to the user by publishing the services to a platform accessible to the user's UE in step 220*a*. The platform may for example be a dedicated Services Application Programming Interface (API), accessible by the UE and to which services to be made available to the user are published.

Services published to the API may be accessed by the user's UE for example via an Application as discussed in further detail below with reference to FIG. 6*a*.

Having published the filtered services to a user accessible platform, the network node proceeds to filter data traffic to and/or from the user according to the relation of the traffic to the published services. Initially, the network node awaits the arrival of data traffic either from or to the user at step 230*a*. On receipt of traffic, the network node then checks whether the traffic corresponds to any one of the published services. Data traffic may be considered to correspond to a service if for example its origin or destination address is an address of the provider of the service. If the received traffic corresponds to one of the published services (Yes at step 230*b*), the network node forwards the traffic to its destination at step 230*c*, either to the service provider or to the UE.

If the received data traffic does not correspond to one of the published services (No at step 230*b*), the network node may treat the traffic differently according to whether it originates from the UE or from the service provider. In some examples it may be appropriate to block traffic from the service provider, but to allow the user an override option should they wish to use a data service that is not among those presented to them (for example a data service which will not be free of charge or at reduced cost).

In the illustrated example of FIG. 2, the network node checks, at step 230*d*, whether the traffic is received from the UE. If the traffic is not received from the UE (no at step 230*d*), the traffic is simply stopped and the packets are discarded at step 230*e*. If the traffic is from the UE, (Yes at step 230*d*), the traffic is held or buffered and an information message is sent to the UE at step 230*f*. This message may for example inform the user that the traffic received corresponds to a service that is not included among the offered services, and inviting the user to confirm whether or not they wish to continue. This may be particularly appropriate in the example implementation of free data services, when a user may be asked to explicitly confirm they wish to proceed with a non-free service, and that they agree to assume the associated cost. The network node may check at step 230*g* whether a confirmation instruction has been received from the user, confirming that the data traffic should be forwarded. If such an instruction is received, (Yes at step 230*g*), the traffic is forwarded to its destination at step 230*h*, and a flag may be set to ensure that responding traffic from the service provider is forwarded directly to the user. If no confirmation instruction is received from the user, the held data traffic may be definitively stopped and the packets discarded at step 230*i*.

The methods 100, 200 described above may thus facilitate the use of data services while roaming by enabling selective service use. Particular services may be presented to the user, for example as being free of charge or reduced cost when roaming, and traffic relating to any services other than the presented services may be blocked. In this manner, a user may continue to benefit from certain data services when roaming, while at the same time avoiding the high charges associated with maintaining full data service capability when roaming.

Figure 3:
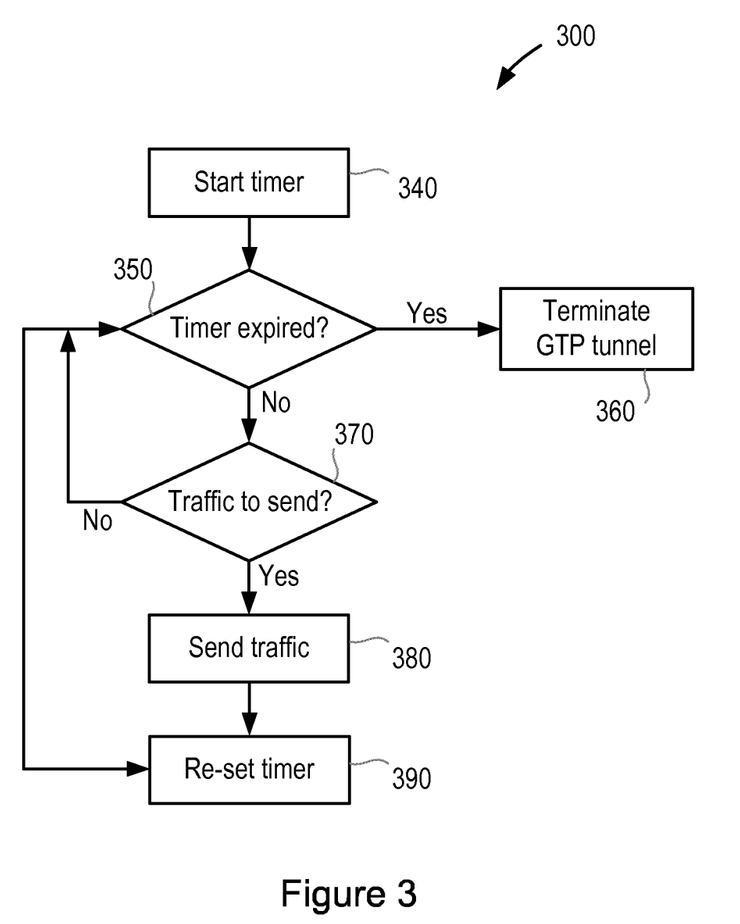
FIG. 3 is a flow chart illustrating process steps in a method for managing a GTP tunnel.

In parallel with the methods 100, 200 discussed above, the network node may also terminate unused GPRS Tunneling Protocol (GTP) tunnels to roaming UEs. This process is illustrated as method 300 in FIG. 3. The process of FIG. 3 may be run in conjunction with the method 100, 200 for delivering data services, being run each time traffic to the UE (southbound traffic) is delivered. Referring, to FIG. 3, on delivery of southbound traffic to the UE, a timer is started in step 340. The timer applies to the GTP tunnel over which the traffic is delivered to the UE. The network node then checks at step 350 whether the timer has expired. The expiry time of the timer may be configurable by the network operator to be an appropriate amount of time within the operational context. If the timer has expired (Yes in step 350), the GTP tunnel is terminated, thus freeing up one GTP termination point and avoiding the GTP tunnel being maintained unnecessarily. If the timer has not expired (No in step 350), the network node checks whether it has data traffic to send via the tunnel in step 370. If there is no data traffic to send (No in step 370), the network node continues to check for expiry of the timer. If the network node has data to send across the tunnel, the data traffic is sent in step 380 and the timer is re-set in step 390. The network node then returns to checking for expiry of the timer in step 350. In this manner, each time a GTP tunnel is established to the UE, the network node checks whether it should be maintained, and terminates the tunnel if it is unused for a configurable amount of time. This may be the case for example if data roaming is enabled but the user does not make use of the any of the data services presented via the methods 100, 200.

Figure 4:
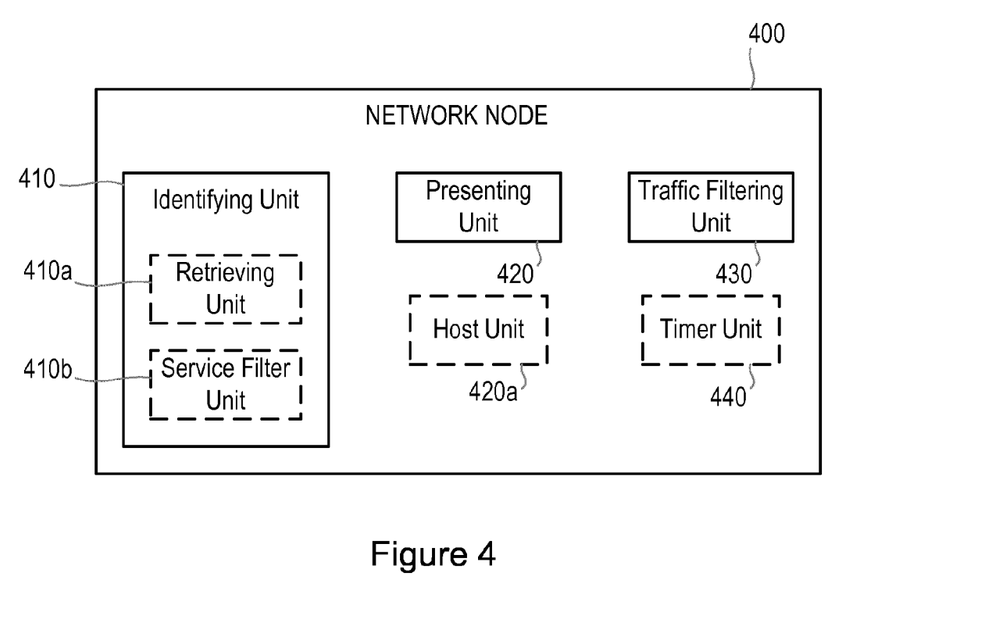
FIG. 4 is a block diagram illustrating functional units in a network node.

As discussed above, the methods 100, 200, in conjunction with the method 300, may be conducted by a network node. Apparatus for conducting the methods described above, for example on receipt of suitable computer readable instructions, may be incorporated within a network node such as a MSP or GGSN. FIG. 4 illustrates functional units in a network node 400 which may execute the steps of the methods 100, 200, 300, for example according to computer readable instructions received from a computer program. It will be understood that the units illustrated in FIG. 4 are functional units, and may be realised in any appropriate combination of hardware and/or software.

With reference to FIG. 4, the network node 400 comprises an identifying unit 410, a presenting unit 420 and a traffic filtering unit 430. The identifying unit may comprise a retrieving unit 410a and a service filtering unit 410b, and the network node may further comprise a host unit 420a and a timer unit 440. The identifying unit 410 is configured to identify services to be made available to a user when roaming, the presenting unit 420 is configured to present the identified services to a UE of the user, and the traffic filtering unit 430 is configured to filter at least one of data traffic to the UE or data traffic from the UE according to a relation of the data traffic to the identified services. The retrieving unit 410a may be configured to retrieve an identification of at least one service from a memory and the service filtering unit 410b may be configured to filter the retrieved service or services according to at least one of a geographic location of the UE or a network user profile of the user. The host unit 420a may be configured to host a platform accessible to the UE and the timer unit 440 may be configured to terminate an established data communication channel to the UE after a period of inactivity on the channel exceeding a threshold limit.

Figure 5:
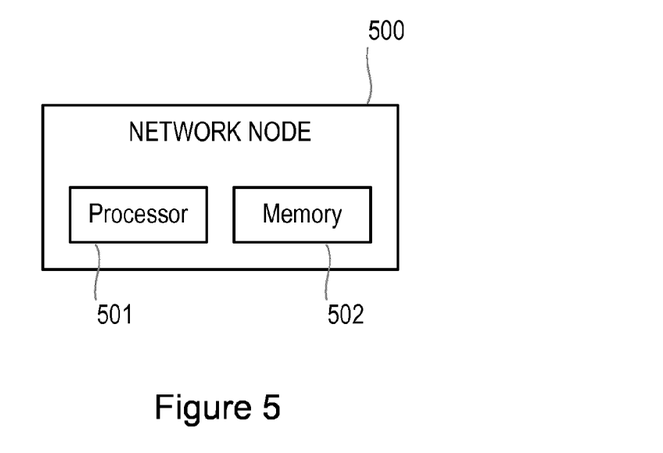
FIG. 5 is a block diagram illustrating functional units in another network node.

FIG. 5 illustrates another example of network node 500 which may be configured to conduct any of the methods 100, 200, 300. The network node 500 comprises a processor 501 and a memory 502. The memory 502 contains instructions executable by the processor 501 such that the network node 500 is operative to conduct the steps of any of the methods 100, 200, 300.

As discussed above, the services presented by the network node according to the methods 100, 200 may be accessed by a user via their UE. FIG. 6a illustrates process steps in a method 600 for accessing data services while roaming. The method may for example run within an application installed on a UE. For the purposes of illustration, the method 600 is described below with reference to a nominal "roaming application" running on a UE. Initially, the roaming user starts the roaming application within their UE. In a first step 610 of the method 600, the application accesses an identification of services available to the user when roaming. This may for example comprise accessing the Service API discussed above on which available services are published. Having accessed the published services, the application then selects services for presentation to the user at step 620. This may for example involve filtering the accessed services according to a device user profile. In accordance with the method 200 above, the services accessed by the application may already have been filtered according to network user profile and geographic location of a user. The application may further refine the service selection according to a device user profile, which may for example be stored on the UE and may be quickly and easily configurable by the user. By adjusting their device user profile, the user may quickly adjust the parameters determining what range of services are selected by the application.

Having selected services for presentation to the user, the application then displays the selected services to the user in step 630. This may for example involve displaying icons representing the services on a screen of the UE. The application then checks whether any of the displayed services has been requested by the user at step 640, and if so, initiates a connection to a provider of the requested service at step 650. The process of initiating a connection to a service provider may involve different steps depending upon whether the network node hosting the service API is within the user's home network or the visited network on which the user is roaming. This is discussed in further detail with reference to FIGS. 9 to 11. By launching a data service directly through the roaming application, the user may conveniently launch a service that the user may be confident is available for use when roaming, and which in some example implementations may be free of charge.

Figure 6A:
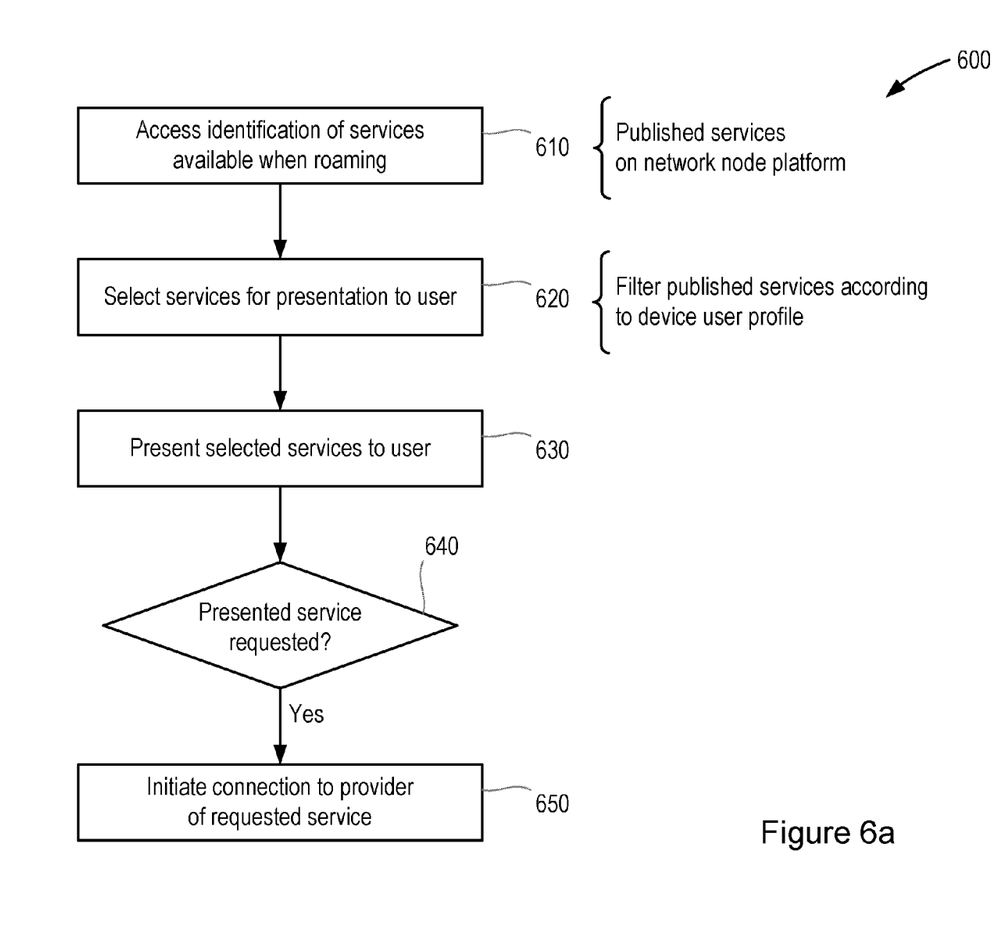
FIG. 6a is a flow chart illustrating process steps in a method for accessing data services when roaming.
Figure 6B:
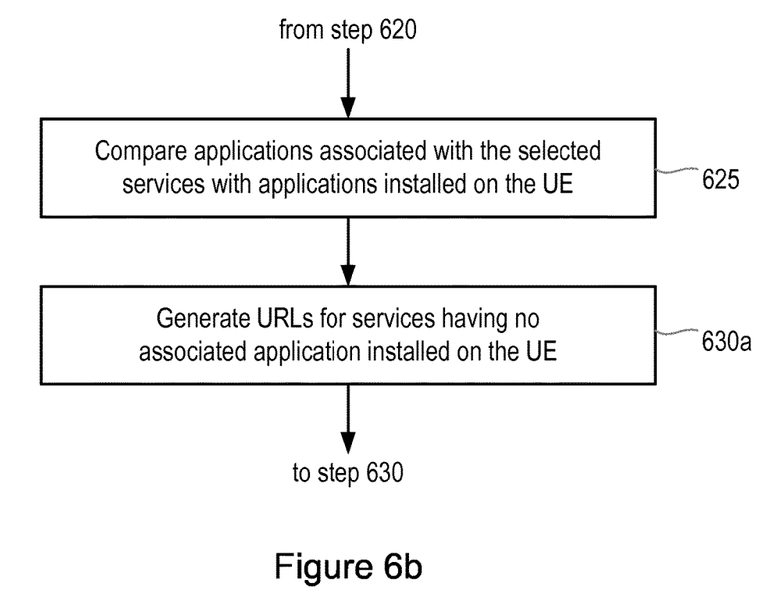

FIG. 6b illustrates additional steps which may be conducted by the roaming application as part of the method 600 of FIG. 6a. In the example of FIG. 6b, after selecting services for presentation to the user at step 620, the roaming application then compares applications associated with the selected services with applications installed on the UE in step 625. The selected services may be accessed via applications which may be installed on the user equipment device or may be remotely hosted. Some of the selected services may have an associated or corresponding application installed on the UE. For example, if a social media service is among the selected data services, and an application for that social media service is installed on the UE, then the comparison step will identify the correspondence between the installed social media application on the UE and the available social media service selected from among those presented on the Services API. This may be the case with well known and largely geographically independent data services. In contrast, for some data services, there may be no corresponding application associated with that service installed on the UE. This may be the case for example for local services that have been presented on the Service API and selected by the roaming application on the basis of the geographic location of the user. A taxi service in a country which the user is visiting for the first time may be selected by the roaming application on the basis of its potential usefulness to the user, but the user is unlikely to have installed a corresponding application for that service in their UE. The comparison step 625 thus identifies those selected data services having associated applications installed on the UE and those selected data services which do not have associated applications installed on the UE.

Referring again to FIG. 6b, as a part of presenting the selected services to the user at step 630, the roaming application in the UE then generates URLs for selected services having no associated application installed on the UE in step 630a. These URLs may point to a web hosted application for the selected service. When presenting the selected services to the user at step 630, the roaming application may present the generated URLs as "Web applications". These Web applications may be presented alongside links to the UE installed applications associated with the remaining selected services. As these Web applications are created by the roaming application on the basis of services presented by the Services API, the Web applications will only be visible to the user through the roaming application, and will not be visible or accessible to the user elsewhere on the UE. In following the above steps, the roaming application may thus present to the user a representation of and access to applications, either installed on the UE or remotely hosted, that correspond to services offered when roaming. In the implementation example in which the particular services offered through the network node and the roaming application are free of charge when roaming, the applications presented by the remaining application are those applications which are free to use when roaming. The user may thus refer to the roaming application and not only be presented with potentially useful services but also may be confident that those services are available when roaming/ free of charge when roaming/charged at a reduced rate when roaming, according to the particular implementation example.

When initiating a connection to a service provider of a requested service, the roaming application may additionally launch the UE installed application for that service on the UE, in the case of a service having a corresponding application installed on the UE. If a service is requested for which no corresponding application is installed on the UE, initiating a connection with the service provider may comprise following the link to the remotely hosted application for the requested service.

Figure 7:
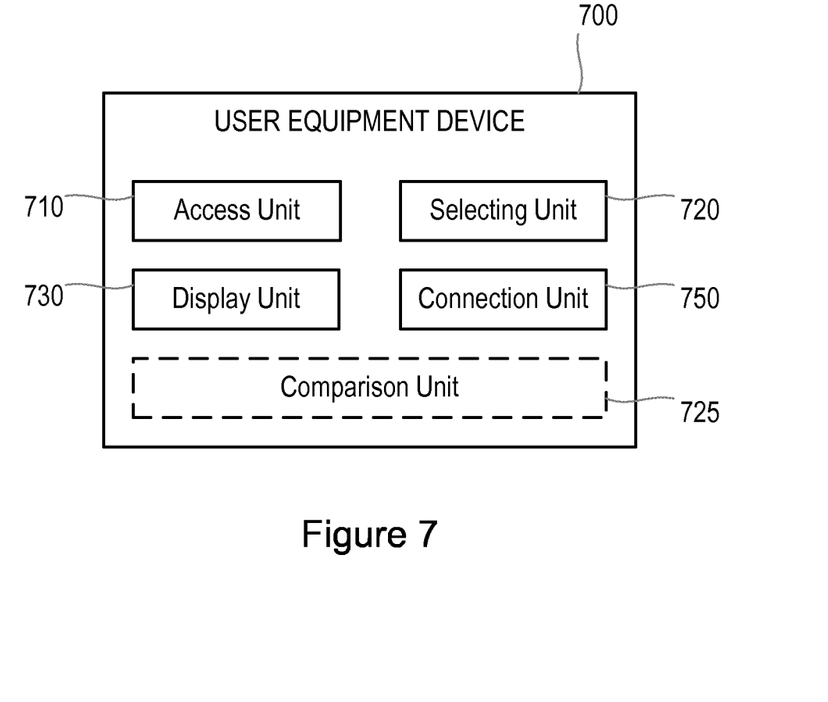
FIG. 7 is a block diagram illustrating functional units in a user equipment device.

As discussed above, the method 600 may be conducted by a UE, for example running a dedicated roaming application which may be embodied within a computer program. Apparatus for conducting the method 600, for example on receipt of suitable computer readable instructions corresponding to the roaming application, may be incorporated within a UE. FIG. 7 illustrates functional units in a UE 700 which may execute the steps of the method 600, for example according to computer readable instructions received from a computer program. It will be understood that the units illustrated in FIG. 7 are functional units, and may be realised in any appropriate combination of hardware and/or software.

With reference to FIG. 7, the UE 700 comprises an access unit 710, a selecting unit 720, a display unit 730 and a connection unit 750. The UE may further comprise a comparison unit 725. The access unit 710 is configured to access, from a network node, an identification of services available to a user of the user equipment device when roaming. The selecting unit 720 is configured to select, from the identification of services, services for presentation to the user. The display unit 730 is configured to present the selected services to the user, and the connection unit 750 is configured, on request of a presented service by the user, to initiate a connection to a provider of the requested service. The comparison unit 725, if present, is configured to compare applications associated with the services selected by the selecting unit with applications installed on the user equipment device.

Figure 8:
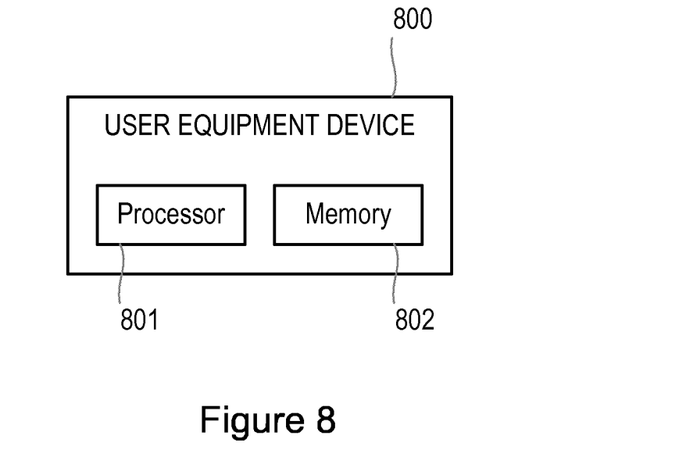
FIG. 8 is a block diagram illustrating functional units in another user equipment device.

FIG. 8 illustrates another example of UE 800 which may be configured to conduct the method 600. The UE 800 comprises a processor 801 and a memory 802. The memory 802 contains instructions executable by the processor 801 such that the UE 800 is operative to conduct the steps of the method 600. The instructions contained in the memory 802 may include instructions corresponding to the above described roaming application.

Figure 9:
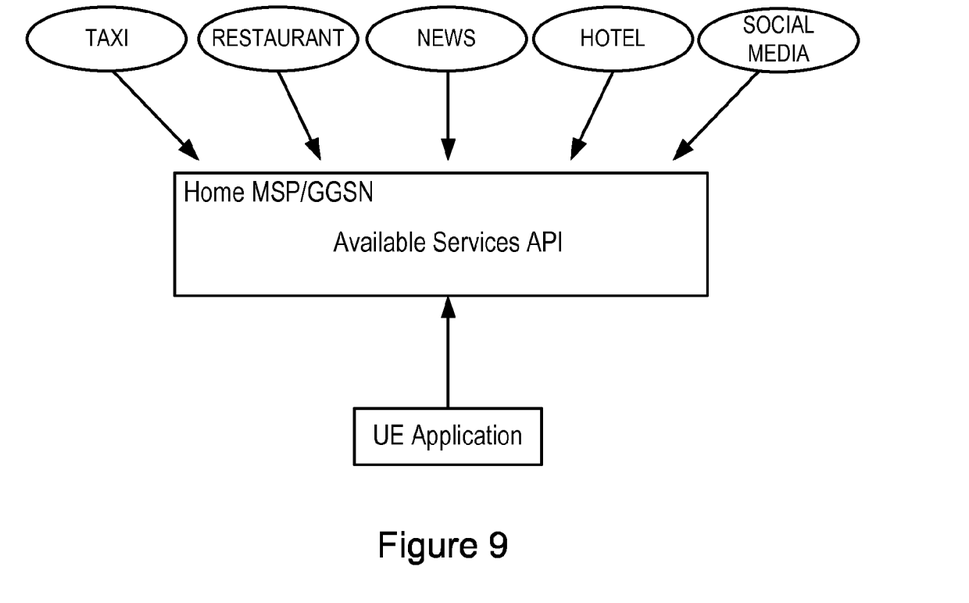
FIGS. 9 and 10 are representative illustrations of operation of a first example of methods for delivering and accessing data services when roaming.
Figure 10:
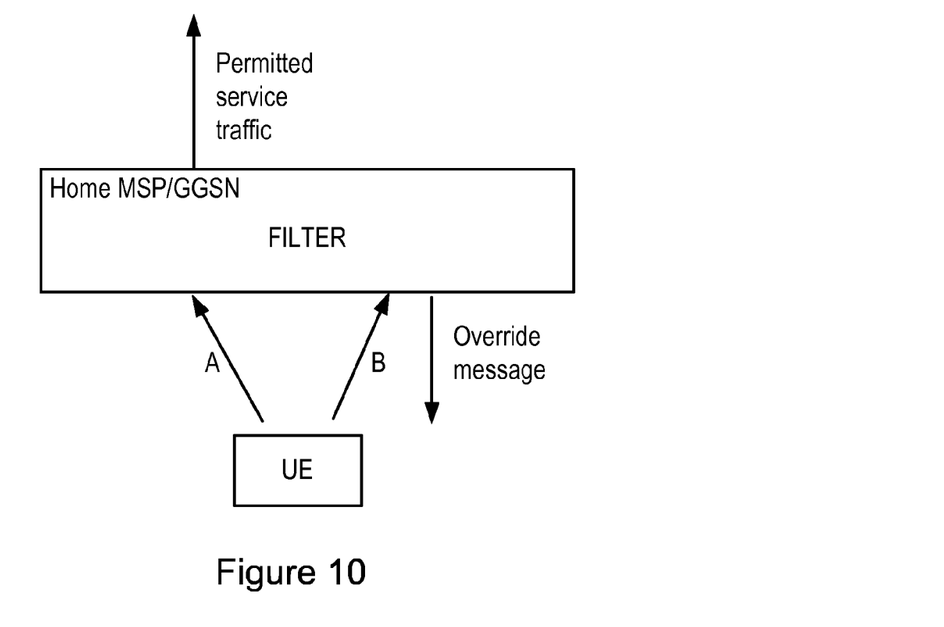

FIGS. 9 and 10 illustrate a first example of operation of methods 100, 200 for delivery of data services and method 600 for access to data services when roaming. As discussed above, methods for delivery of data services when roaming may be delivered via a network node in the roaming user's home network or a network node in the visited network. In the first example illustrated in FIGS. 9 and 10, the network node is located in the home network of the user.

Referring initially to FIG. 9, a user travelling outside the coverage area of their home network opens the roaming application on their UE. The roaming application accesses the Services API hosted on a network node in the user's home network. This may for example be a MSP or a GGSN. Published on the Services API are data services which are available to the user for roaming access. As discussed above, the published services may for example be offered free of charge or at a reduced rate when the user is roaming. The network node may undertake filtering of the available services to show to the roaming application only those services which are most appropriate for the user in their current location and in light of their user profile. The roaming application may display all of the services shown on the Services API to the user or may undertake additional filtering to display to the user the services most closely matching their requirements, location or preferences. The user may then choose to start one of the displayed data services via the application.

Referring to FIG. 10, two examples of data traffic originating from the UE are illustrated. The first stream A relates to a published data service accessed and started via the roaming application. This data traffic passes via the network node (the home MSP or GGSN) which checks the destination of the traffic. The home network node determines from the destination address of the traffic that it relates to a published service. The network node thus forwards the traffic to its destination. Data traffic B represents data traffic corresponding to a data service which is not published on the services API. This may for example be a service which is not offered free or at a reduced rate when roaming. This data stream may be generated by launching the service directly from the operating system of the UE, without passing via the roaming application. When data stream B arrives at the home MSP/GGSN, the traffic is identified as corresponding to a service which is not included on the services API. The network node may then simply block the traffic and inform the user that the requested action will not be performed as it relates to a data service which has not been made available for roaming. This information may for example be conveyed in a TCP RST message. Alternatively, the network node may buffer the traffic and send a message to the user informing them that the requested action involves a service not included within the published services made available, for example at preferential rates, and inviting the user to confirm whether or not they wish to continue with the operation, for example authorising the additional costs which may be involved. The user can then elect to continue with the operation or abandon the operation.

Figure 11:
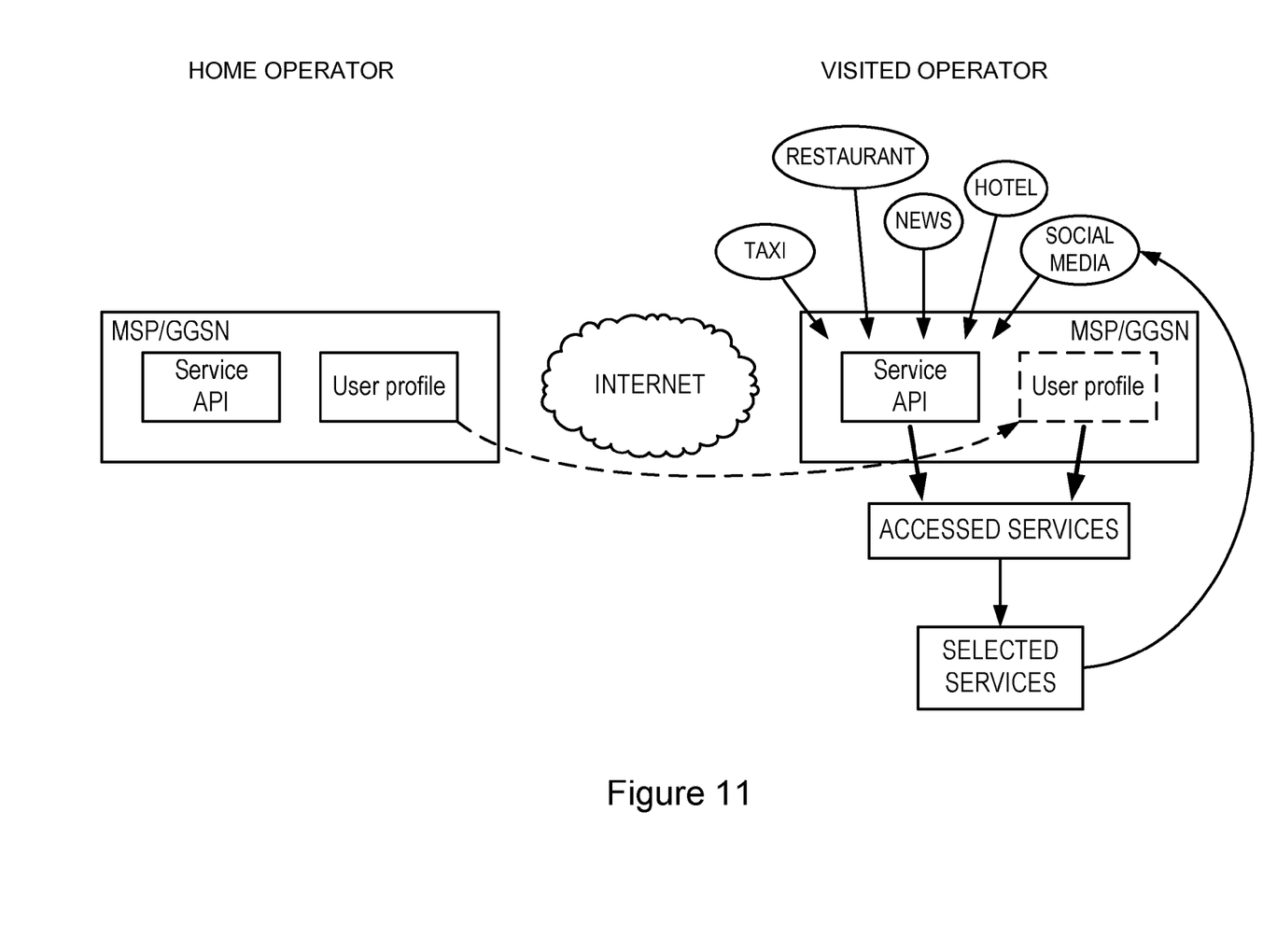
FIG. 11 is a representative illustration of operation of a second example of methods for delivering and accessing data services when roaming.

FIG. 11 illustrates a second example of operation of methods for delivery of and access to data services while roaming. In the example of FIG. 11, the network node at which the method for delivery of data services is run is located in a visited network. Referring to FIG. 11, a user travelling outside the coverage area of their home network opens the roaming application on their UE. The roaming application accesses the services API hosted on a network node in the visited network. In order to present to the UE application the most appropriate services for the user, the network node in the visited network requests the user profile of the user from the user's home network, and may then use this profile together with the user's location to present to the application a suitable range of services for access. The UE application accesses the presented services and may further refine them by selecting the most appropriate services for the user according to the user profile stored on the UE. The user then selects a service to access and launches the service through the application. In this example, the data traffic relating to the launched service is routed via the visited network only, using the gateway node of the visited network rather than routing through the visited network back to the home network and then to the service provider. In order to assure this "early breakout", in which traffic is routed via the gateway of the visited network, the roaming application may use a special Access Point Name (APN), in order to route the traffic via the visited network gateway. Data traffic from other services not published on the Services API, and launched from within the UE's operating system rather than the roaming application, will not be routed with the special APN to the visited network gateway but will instead be routed via the normal home APN to the home network. Here the data stream may be identified as corresponding to a service not published on the Services API and so stopped or buffered as described above with reference to FIG. 10.

As discussed above, the services published to the services API, and hence presented to the roaming user, may be offered to the user free of charge, or at a reduced fee compared to usual roaming data charges. This may be managed in a number of different ways, depending for example on whether the network node presenting the services and filtering the data traffic is located in the user's home network or in the visited network. In the case of a network node located in the visited network, the data charges associated with use of the published services may be directly settled between the visited network operator and the service provider, with no charges being passed on to the home network operator. A subscription arrangement between the service providers and visited network operator may be envisaged. In other examples, with the network node located in the home network, agreements between the home and visited network may establish charging practices. For example, the visited network may refrain from sending Call Data Records (CDRs) to the home network for the traffic relating to the free or reduced price services, covering these data costs by charges to the service providers for example. Alternatively the visited network operator may send specific CDRs to the home network operator for the traffic relating to the free services, allowing the home operator to allocate these charges to be covered via arrangements with the service providers rather than passed on to the user. Service providers may enter into a range of agreements with network operators based on a regular subscription or other payment arrangement.

It will be appreciated that considerable advantages may be enjoyed by service providers in offering their services to roaming customers at favourable rates or free of charge. Taking the example of international travel, local providers of services including transport services, hotels and restaurants may gain valuable exposure through publication on the Services API to foreign visitors who may not otherwise be aware of their services. Particular visiting nationalities may be targeted by forming agreements with the network operators in the visitor's home countries.

Network operators and users also benefit from the selective availability of services. Users can take advantages of data services which may be particularly valuable to them in a roaming environment without incurring the excessive costs that are often associated with data roaming. By offering users an alternative to simply turning off data services when roaming, both home and visited network operators experience increased data traffic and hence increased revenue.

Aspects of the present invention thus provide advantages over the existing options of full data service or zero data service when roaming. The selective offering of data services when roaming offers a flexibility in data access which may allow users to benefit from specific services while roaming without incurring the costs of full data service. Different commercial models may be used to increase the attractiveness of the offering for users, network operators and for external service providers.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for delivering data services to a user via a roaming user equipment device, the method comprising:
   receiving a request transmitted by the roaming UE device;
   selecting services to be made available to the user when roaming;
   transmitting to the roaming UE device a response to the request, wherein the response to the request transmitted to the roaming UE comprises information identifying each of the selected services, thereby enabling a roaming application executing on the roaming UE device to inform the user of the selected services that are available to the user;
   receiving first data traffic;
   determining a relation of the first data traffic to the identified services; and
   filtering the first data traffic according to the determined relation of the first data traffic to the identified services, wherein the first data traffic is at least one of: i) data traffic to the user equipment device and ii) data traffic from the user equipment device.

2. The method of claim 1, wherein the selecting of the services to be made available to the user when roaming is performed in response to receiving the request.

3. The method of claim 2, wherein
   the method further comprises determining a geographic location of the user equipment device, and
   the step of selecting the services to be made available to the user when roaming comprises selecting the services based on the determined geographic location of the user equipment device.

4. The method of claim 2, wherein
   the method further comprises obtaining a network user profile of the user, and
   the step of selecting the services to be made available to the user when roaming comprises selecting the services based on information included in the network user profile.

5. The method of claim 4, wherein
   the method further comprises determining a geographic location of the user equipment device, and
   the step of selecting the services to be made available to the user when roaming comprises selecting the services based on information included in the network user profile and the determined geographic location of the user equipment device.

6. The method of claim 1, wherein
   determining a relation of the first data traffic to the identified services comprises determining that the first data traffic does not correspond to any one of the identified services; and
   filtering the first data traffic according to the relation of the first data traffic to the identified services comprises withholding the first data traffic as a result of determining that the first data traffic does not correspond to any one of the identified services.

7. The method of claim 6, wherein withholding the first data traffic comprises:
   temporarily storing the first data traffic; and
   sending to the user equipment device an information message indicating that data traffic corresponding to a service other than one of the identified services is being held.

8. The method of claim 1, wherein the method is performed by one or more network nodes within a home network of the user.

9. The method of claim 1, wherein the method is performed by one or more network nodes within a visited network of the user.

10. The method of claim 9, wherein selecting services to be made available to the user when roaming further comprises interrogating a home network of the user for a network user profile of the user.

11. The method of claim 9, wherein the step of filtering data traffic comprises:
    receiving data traffic;
    determining an Access Point Name (APN) associated with the received data traffic; and
    filtering the received data traffic according to the determined APN.

12. The method of claim 1, further comprising terminating an established data communication channel to the user equipment device after a period of inactivity on the channel exceeding a threshold limit.

13. A method, in a roaming user equipment (UE) device, for accessing data services, the method comprising:
    the roaming UE device transmitting a request to a network node in a visited network;
    the roaming UE device receiving, from the network node in the visited network, a response to the request, wherein the response to the request comprises a set of one or more service identifiers, wherein each service identifier identifies a service available to a user of the user equipment device;
    the roaming UE device selecting one or more of the services identified in the response;
    the roaming UE device displaying to the user information identifying each one of the selected services; and
    in response to the user requesting one of the selected services, initiating a connection to a provider of the requested service.

14. The method of claim 13, wherein displaying to the user information identifying each one of the selected services comprises displaying a link for accessing an application associated with one of the selected services.

15. The method of claim 13, wherein selecting one or more of the services comprises selecting the services based on a device user profile of the user.

16. The method of claim 13, further comprising, after selecting the services, comparing applications associated with the selected services with applications installed on the user equipment device.

17. The method of claim 16, wherein displaying to the user information identifying each one of the selected services comprises:
    for a selected service having an associated application installed on the user equipment device, presenting a link to the associated application on the user equipment device; and
    for a selected service not having an associated application installed on the user equipment device, presenting a link to a remotely hosted application for the selected service.

18. The method of claim 13, wherein initiating a connection to a provider of the requested service comprises using an Access Point Name corresponding to a home network of the user equipment.

19. The method of claim 13, wherein initiating a connection to a provider of the requested service comprises using an Access Point Name corresponding to a visited network of the user equipment.

20. A computer program product comprising a non-transitory computer readable medium storing a computer program for performing the method of claim 13.

21. An apparatus configured for delivering data services to a roaming user accessing the services via a roaming user equipment (UE) device, the apparatus comprising:
    a processor; and
    a memory coupled to the processor, wherein the apparatus is configured to:
    receive a request transmitted by the roaming UE device;
    select services to be made available to the user when roaming;
    transmit to the roaming UE device a response to the request, wherein the response to the request transmitted to the roaming UE comprises information identifying each of the selected services, thereby enabling a roaming application executing on the roaming UE device to inform the user of the selected services that are available to the user;
    receive first data traffic, wherein the first data traffic is at least one of: i) data traffic to the user equipment device and ii) data traffic from the user equipment device;
    determine a relation of the first data traffic to the identified services;
    filter the first data traffic according to the determined relation of the data traffic to the identified services.

22. The apparatus of claim 21, wherein the apparatus is configured to select the services to be made available to the user when roaming in response to receiving the request.

23. The apparatus of claim 22, wherein
    the apparatus is further configured to determine a geographic location of the roaming UE device, and
    the apparatus is configured to select the services to be made available to the user when roaming by selecting the services based on the determined geographic location of the roaming UE device.

24. The apparatus of claim 23, wherein
    the apparatus is further configured to obtain a network user profile for the user, and
    the apparatus is configured to select the services to be made available to the user when roaming by selecting the services based on the network user profile and the determined geographic location of the roaming UE device.

25. The apparatus of claim 21, wherein the apparatus is further configured to terminate an established data communication channel to the user equipment device after a period of inactivity on the channel exceeding a threshold limit.

26. A user equipment (UE) device configured for accessing data services when roaming, the user equipment device comprising a processor and a memory, the memory containing instructions executable by the processor whereby the UE device is operable to:

transmit a request to a network node in a visited network;

receive, from the network node in the visited network, a response to the request, wherein the response to the request comprises a set of one or more service identifiers, wherein each service identifier identifies a service available to a user of the user equipment device;

select one or more of the services identified in the response;

display to the user information identifying each one of the selected services; and after the user requests one of the selected services, initiate a connection to a provider of the requested service.

27. The roaming UE device of claim 26, wherein the roaming UE device is further configured such that, for each selected service, the roaming UE device determines whether an application corresponding to the selected service is installed on the roaming UE device.

28. The method of claim 6, wherein withholding the second data traffic comprises stopping the second data traffic.

29. The method of claim 1, wherein determining a relation of the first data traffic to the identified services comprises determining whether the first data traffic corresponds to any one of the identified services.

30. The method of claim 29, wherein the first data traffic has a source address, the identified services include a first identified service that has a first address, determining whether the first data traffic corresponds to any one of the identified services comprises determining whether the source address matches the first address, and filtering the first data traffic according to the relation of the first data traffic to the identified services comprises discarding the first data traffic as a result of determining that the first data traffic does not correspond to any one of the identified services.

31. The method of claim 13, wherein initiating a connection to a provider of the requested service comprises the UE launching an application associated with requested service.

32. The method of claim 13, wherein displaying to the user information identifying each one of the selected services comprises presenting a link associated with one of the selected services, and initiating the connection comprises following the link to launch a remotely hosted application.

33. The method of claim 21, wherein the apparatus is configured to filter the first data traffic by performing a process comprising:

determining whether the first data traffic corresponds to any one of the identified services, and withholding the first data traffic as a result of determining that the first data traffic does not correspond to any one of the identified services.

* * * * *